Oct. 9, 1962

G. A. FRANK ETAL 3,057,051

ARTICLE ASSEMBLY APPARATUS

Filed May 14, 1959

3 Sheets-Sheet 1

INVENTORS
G.A.FRANK
S.KUBA
By S Gundersen
ATTORNEY

ARTICLE ASSEMBLY APPARATUS

Filed May 14, 1959 3 Sheets-Sheet 2

INVENTORS
G. A. FRANK
S. KUBA
By S. Gundersen
ATTORNEY

ARTICLE ASSEMBLY APPARATUS

Filed May 14, 1959 3 Sheets-Sheet 3

INVENTORS
G.A. FRANK
S. KUBA
By S Gundersen
ATTORNEY 3,057,051
ARTICLE ASSEMBLY APPARATUS
Gerard A. Frank and Samuel Kuba, Allentown, Pa., assignors to Western Electric Company, Incorporated, New York, N.Y., a corporation of New York
Filed May 14, 1959, Ser. No. 813,150
5 Claims. (Cl. 29—203)

This invention relates to article assembly apparatus, and particularly to semi-automatic apparatus for compressing resilient elements against bodies.

In the fabrication of point contact type semi-conductor devices, contact elements or wires are resiliently compressed against a surface of semi-conductor wafers and thereafter encapsulated, electrically formed and otherwise processed. In order to prevent erratic operation of the completed devices, it is essential that a positive force be exerted by the elements against the wafers.

An object of this invention is the semi-automatic assembly of such devices so that adequate force is exerted by the contacting elements.

According to the general features of the invention, the parts, a body such as a semi-conductor wafer, and at least one resilient element, are supported in separate grippers or jaws so that the body contacting portion of the element extends toward the body. At least one of the grippers is movable and is advanced toward the other, being stopped after the resilient element makes contact with the body by the operation of a control circuit which is triggered by contact between the element and body. The movable gripper is thereupon secured to retain the parts in the adjusted position for further processing.

In a preferred embodiment of the invention for assembling point contact type transistors where two resilient point contact elements are compressed against a semi-conductor wafer, the resilient elements are secured in proper space relationship with respect to one another in individual electrically isolated jaws and the wafer is placed in movable jaws removed from the elements. The wafer is moved toward the elements until both are compressed against the wafer, the wafer and the elements being connected in a control circuit for stopping the wafer jaw moving means after the last of the two elements makes contact with the wafer.

These and other features of the invention will be more clearly understood from the following detailed description when taken in conjunction with the accompanying drawing, in which.

Figure 1:
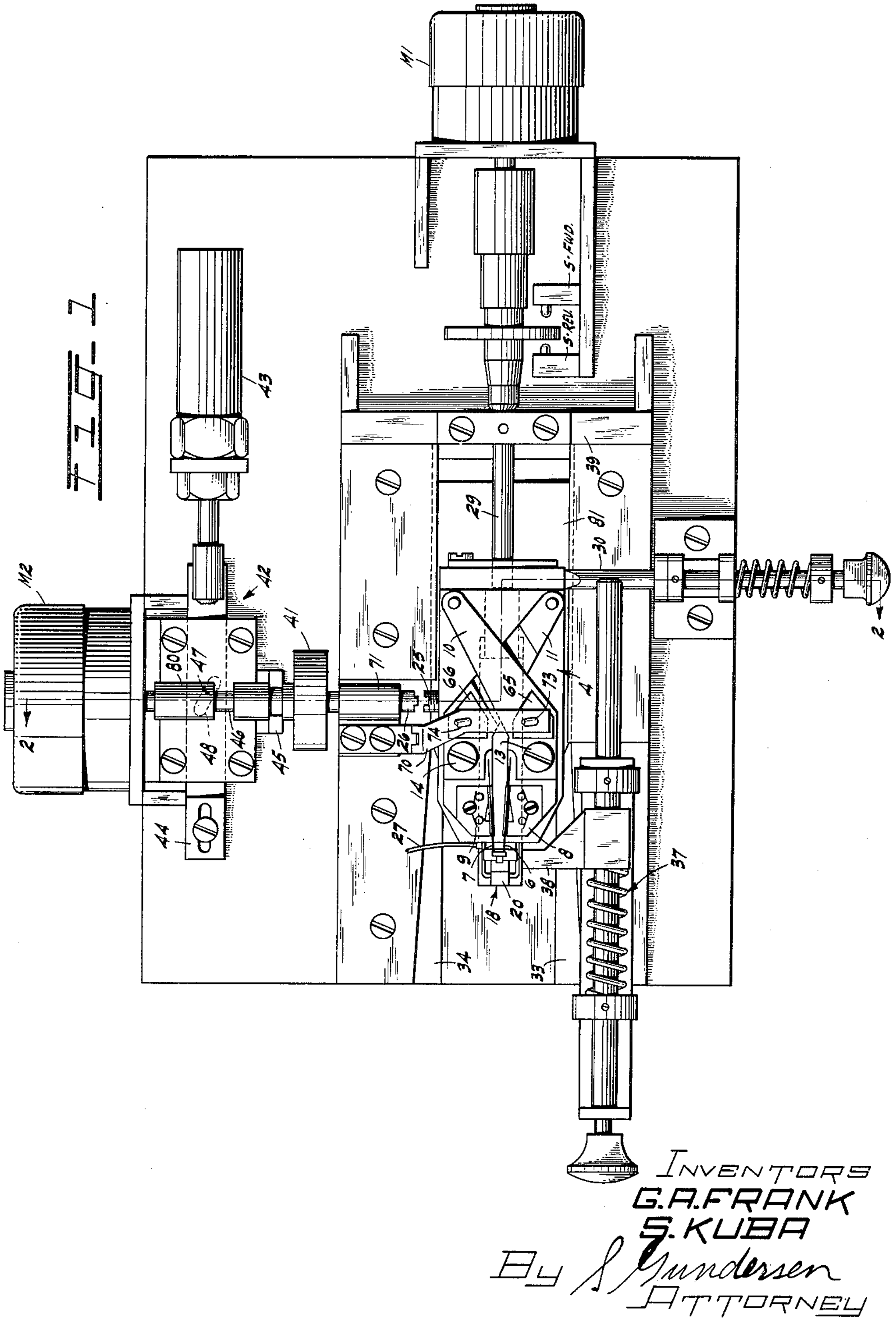
FIG. 1 is a plan view of the apparatus according to the invention, as utilized in fabricating transistors wherein two contact wires are compressed against a semi-conductor wafer.
Figure 2:
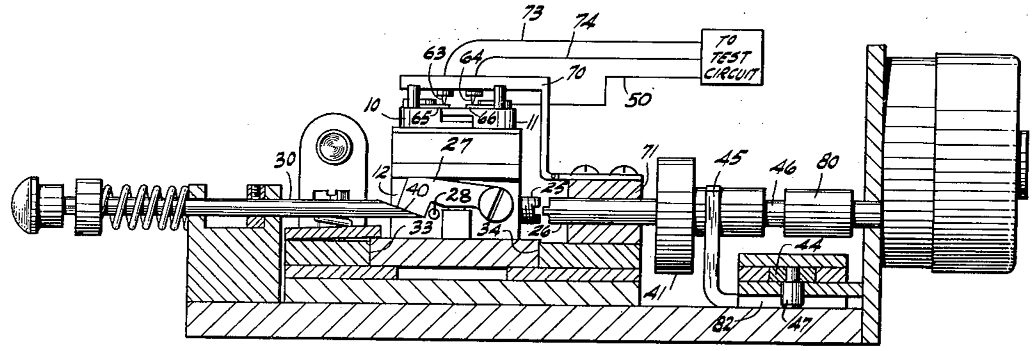
FIG. 2 is a view of the apparatus of FIG. 1 as seen along the plane of line 2—2.
Figure 3:
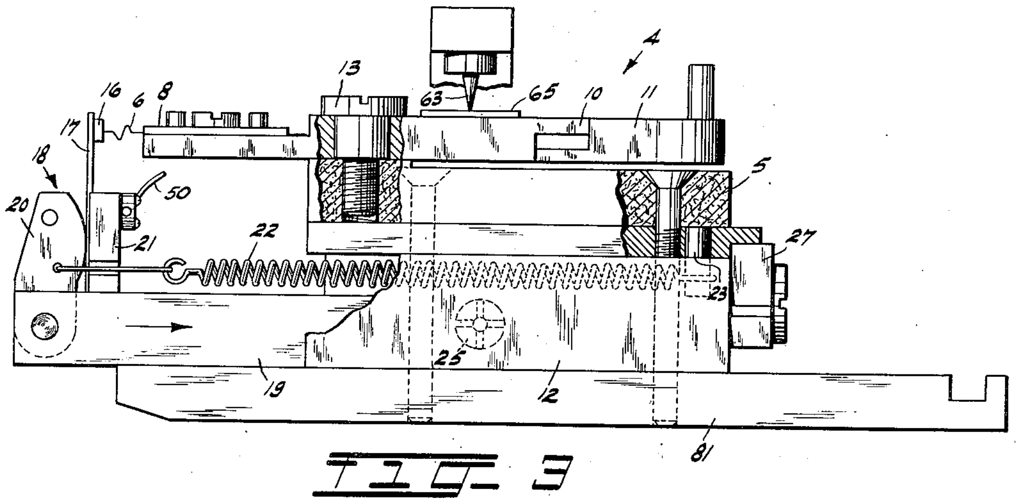
FIG. 3 is a side view of the removable parts holding device apart from the adjusting apparatus.
Figure 4:
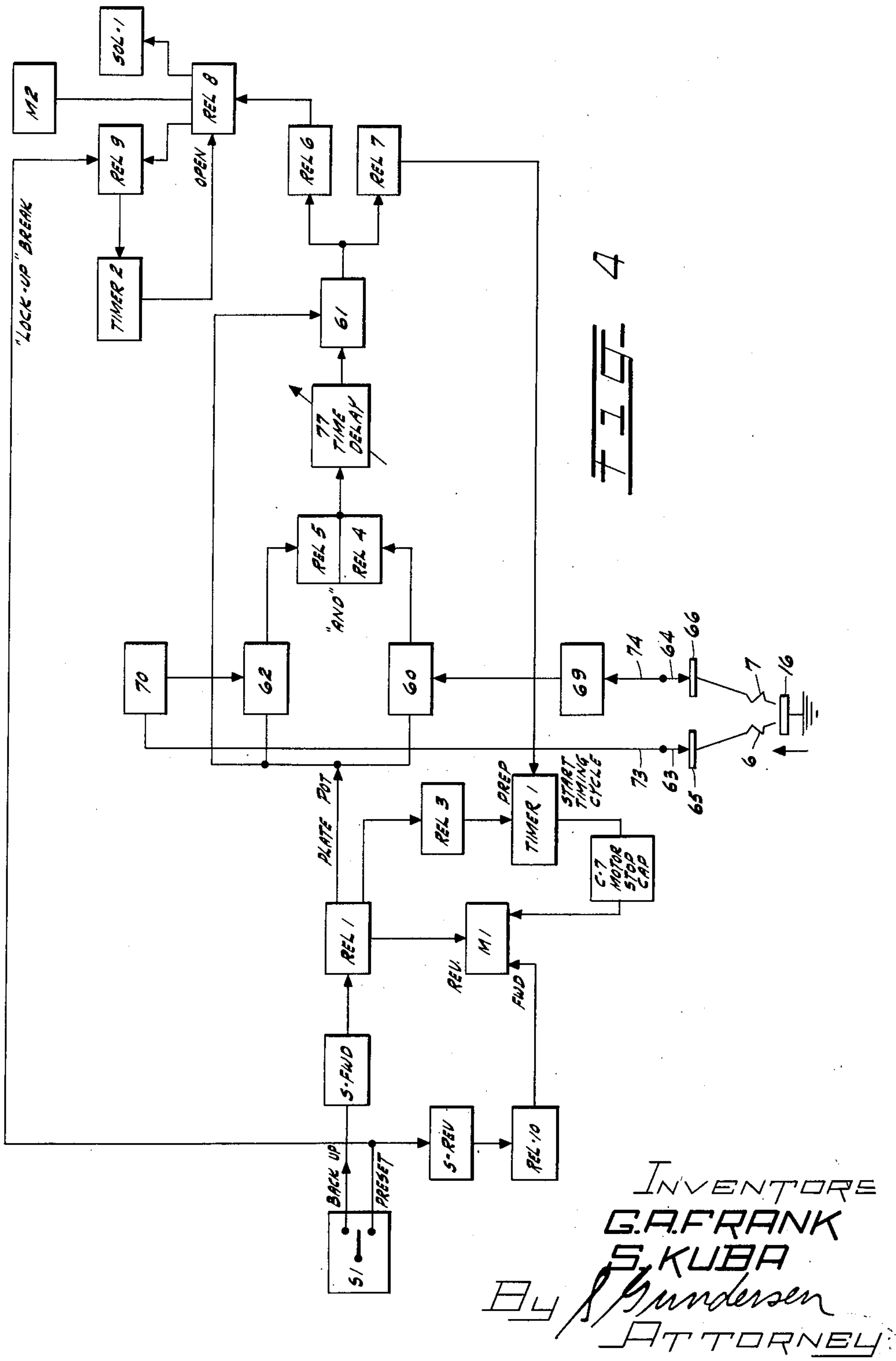
FIG. 4 is a block diagram of the control circuit for the apparatus of FIG. 1.

Referring first to FIGS. 1, 2 and 3, it is seen that S-bent resilient contact wires 6 and 7 are supported in jaws 8 and 9 on the pivotally mounted members 10 and 11, respectively, of a holder 4. The members 10 and 11 are spaced apart from one another and are pivotally mounted by screws 13 and 14 to a phenol fiber insulating member 5 on a block 12 and are thereby electrically isolated from other parts as well as each other. In previous operations, which may be performed on the wires while they are secured in the holder 4, the contact wires 6 and 7 are formed, pointed, and spaced apart with respect to one another. The spacing operation is performed by positioning members 10 and 11 with apparatus such as is disclosed in co-pending application of G. A. Frank, Serial No. 763,655, filed September 26, 1958, which issued as U.S. Patent No. 2,980,991 on April 25, 1961.

The semi-conductor wafer 16, previously bonded to a flat metal strip 17, is secured in jaws 18 on a movable elongated member 19 positioned in a slot extending through block 12. The movable end piece 20 of the jaws 18 is spring biased against an extension 21 by means of a spring 22 having its far end secured to a pin 23 in the block 12 of the holder. This spring 22 in addition to holding the jaws 18 closed, also exerts a force to move the member 19 in the direction of the arrow, the direction the wafer 16 is advanced to move it into contact with the protruding ends of the contact wires 6 and 7. A latch 27 at the end of block 12 blocks the passage to prevent movement of the member 19 until the automatic adjusting operation is started. A set screw 25 is provided in the block 12 for engaging the side of member 19 to lock it in its finally adjusting position. A base plate 81 secured to the bottom of block 12 slides in ways 33 and 34 against a stop 39 to locate the holder in the adjusting apparatus, a rotatable element 38 of a spring holder 37 being utilized to hold it in place. In operating position the screwdriver 26 is aligned with the set screw 25 and the wedge-shaped member 30 is positioned on the side of the latch 27 so that it may engage the inclined surface 40 thereof to lift it off its stop pin 28.

To keep the body 16 from contacting and crushing the wires 6 and 7 when the base 17 is loaded in jaws 18, the member 19 is moved manually to starting position to the left as seen in FIG. 3 so that the pivotally mounted latch 27 on the right end of the block 12 is located in its lowered position resting on pin 28 blocking the path of the member 19. As seen in FIG. 2, the latch 27 is opened by lifting it off the stop pin 28 by means of the wedge 30 so that the spring can move the member 19 to advance the body 16 to the wires 6 and 7. The movable head 29 of a motor driven micrometer mechanism makes contact with the end of the member 19 to control the movement thereof.

The screwdriver actuator 26 is driven by a motor M2 through a slip clutch 41, a quick throw camming mechanism 42 and a spline 80 being provided to move the screwdriver axially into contact with the set screw 25. This quick throw camming mechanism is actuated by an air cylinder 43 which moves a member 44 to the left as shown in FIG. 1, so that a collar element 45 on the output shaft 46 of the motor M2 will be pushed downwardly to move the shaft 46, the clutch 41 and the screwdriver actuator 26. A pin 47 on member 44 serves as a cam against the diagonal camming surface 48 in the lower leg 82 of element 45 to move the element when the cylinder 43 is actuated.

The control diagram of FIG. 5 will now be described in conjunction with a detailed description of the operation of the fixture. Prior to insertion of the holder 4 in the adjusting apparatus, the motor driven micrometer head 29 is located in a "preset" position such that when the holder, preloaded with the contact wires 6 and 7 and the wafer 16 on strip 17, is inserted, it engages and slightly depresses the movable wafer holding member 19 relieving the pressure of the member 19 on the latch 27. The latch lifting member 30 is pushed forward manually to lift the latch at the same time the electrical circuit is activated by manually closing a switch S1 to the "back-up" position. From this point on the cycle is completely automatic. In order to facilitate following the block diagram, relay circuits are designated "REL—," motor circuits are designated "M—"; switching circuits "S—"; and solenoid circuits "SOL—."

By closing switching circuit "S1" to the "back-up" position, relay REL–1 is energized through a micro-switch S–FWD to complete a circuit for the reversible micrometer drive motor M1, to drive the motor in its reverse direction to back-off the micrometer head 29, thereby allowing the spring 22 to move the wafer toward the contact leads 6 and 7 in the wire holding jaws. The operation of relay REL–1 also applies plate potential to thyratron control circuits 60, 61 and 62 and D.C. voltage to operate the clutch (not shown) of a micrometer over-run control timer "TIMER 1" through contacts of relay REL–3.

Electrical contact is made from the test circuit to the resilient contact wires 6 and 7 held in the jaws by means of leads 73 and 74, connected to contactors 63 and 64 which in turn engage palladium elements 65 and 66, respectively, on the wire holding jaws. Contactors 63 and 64 are insulatedly mounted on a hinged bracket 70 secured to a sleeve or guide member 71 for the screwdriver actuator 26. The bracket is folded back when the holder 4 is inserted in the ways 33 and 34 to prevent interfering therewith. A plug-in lead 50 makes a connection from the ground terminal of the test set to the movable wafer jaws 18 on member 19. The individual contact wires 6 and 7 in jaws 8 and 9 are electrically isolated from one another and the circuit is interlocked, as will be described below in order that the micrometer motor M1 will not be stopped until after both contact wires 6 and 7 engage the wafer and are deflected a prescribed amount.

When the contact wire 7 touches the wafer 16, positive bias is applied through contactor 64 and lead 74 to vacuum tube trigger circuit 69 which fires a thyratron circuit 60 to actuate a relay REL–4 of an "AND" circuit. When contact wire 6 touches the wafer, a like action (through contactor 63 and lead 73) occurs with vacuum tube trigger circuit 70 to fire the thyratron circuit 62 to actuate a relay REL–5 also for the "AND" circuit. When both thyratron circuits 60 and 62 are conducting, relays REL–4 and REL–5 operate to produce a signal in the output of the "AND" circuit to fire thyratron circuit 61 after a predetermined time delay as established by the setting of the delay circuit 77. The conducting thyratron circuit 61 energizes relays REL–6 and REL–7. Relay REL–7 operates to remove the D.C. voltage from delay timer "TIMER 1," which now indicates total delay, and operates to open the energizing circuit of motor M1 and applies the charge of capacitor C–7 through the motor field, causing it to come to an abrupt stop. The time delay is provided to allow the motor M1 to overdrive and thereby produce the proper deflection of the contact leads against the wafer.

Relay 6, which also operates when thyratron circuit 61 is rendered conducting, closes the energizing circuit for relay REL–8 which operates to energize the screwdriver motor M2 and also activates solenoid SOL–1 to actuate the quick throw camming mechanism 42. The screwdriver actuator 26 thereupon locks the member 19 in the body. Relay REL–8 also energizes relay REL–9 which operates to lock itself and activates a timer "TIMER 2." The timer "TIMER 2" is set to allow a sufficient elapse time to ensure the proper locking of the member 19. The timer opens the circuit for relay REL–8, thereby de-energizing the screwdriver drive motor M–2 and releasing the solenoid SOL–1 to return the quick throw mechanism to its normal position. A slip clutch 41 is provided on the screwdriver actuator shaft to permit the motor M2 to continue driving after the locking screw 25 is seated and before the timer operates to de-energize the motor M2. Contactor bracket 70 is then folded back and the holder 4 is then removed from the adjusting apparatus. The switch S–1 is moved from "back-up" to "preset" position, thereby releasing the operated relays, and prepares the control circuit for another operation. In addition, relay REL–10 is energized through a limit switch S–REV to energize the motor M1 to advance the micrometer drive to return the micrometer head to "preset" starting position, at which time the switch S–FWD is opened stopping the motor.

The other micro-switch S–FWD in series with the energizing circuit of relay REL–1 is provided to prevent the over-running of the micrometer mechanism, the micro-switch being opened when the micrometer mechanism is backed off a predetermined amount.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for compressing at least one resilient element against a body, which comprises, a removable holder positioned in the apparatus and having movable jaws for supporting the body, means for supporting the resilient element with a free end thereof extending toward the body in the jaws, a spring for holding the jaws closed and for urging the jaws toward the element supporting means, means effective for positively locking the jaws in one predetermined adjusted position on the holder upon the desired compression of the element against the body, a driver for controlling the movement of the jaws toward the element supporting means, and electrical control means including the jaws and element supporting means responsive to the body making contact with the resilient element for stopping the driver and for actuating the locking means.

2. Apparatus according to claim 1 in which the jaws are located on a slide movable within a passage in the holder and the means for locking the jaws comprises a locking screw on the holder movable into engagement with a slide, a screwdriver actuator normally removed from the screw, drive means for rotating the screwdriver actuator, means for advancing the actuator into engagement with the screw and for starting the drive means, and a slip clutch on the actuator to cause the actuator to stop rotating when the screw is tightened.

3. Apparatus for compressing at least two resilient elements against a body with a removable holder positioned therein, which comprises, means for gripping the body, a gripper for supporting the elements in fixed space relationship and electrically isolated from each other, with the body contacting portions thereof extending toward a body in the gripping means therefor, a driver for advancing one of the gripping means toward the other, means effective for positively locking the movable gripping means in one predetermined adjusted position upon the desired compression of the elements against the body, and an electrical control circuit, including the gripper for the body and the electrically isolated supporting means for the elements, responsive to the body making contact with the resilient elements for stopping the driver for the movable gripper and for actuating the locking means after the last of the elements makes contact with the body.

4. Apparatus according to claim 3 in which the electrical control circuit includes an "AND" circuit having an input circuit for each of the elements and an output circuit for stopping the driver and for actuating the locking means, and means responsive to an element contacting the body for producing a signal in the corresponding input circuit whereby the output circuit is rendered operative only when signals are produced in all of the input circuits.

5. Apparatus according to claim 4 having means for introducing a predetermined time delay after a signal is produced in the output circuit before the driver is stopped and the locking means is actuated to permit a predetermined over-running of the driver to ensure an adequate positive force will be inserted by the elements against the body.

References Cited in the file of this patent

UNITED STATES PATENTS

| | | |
|---|---|---|
| 821,946 | Marshall | May 29, 1906 |
| 1,632,374 | Havenner | June 14, 1927 |
| 2,649,560 | Blair | Aug. 18, 1953 |
| 2,694,168 | North et al. | Nov. 9, 1954 |
| 2,720,475 | Geiger | Oct. 11, 1955 |
| 2,757,440 | Carman | Aug. 7, 1956 |
| 2,873,516 | McCain | Feb. 17, 1959 |